United States Patent Office
3,519,926
Patented July 7, 1970

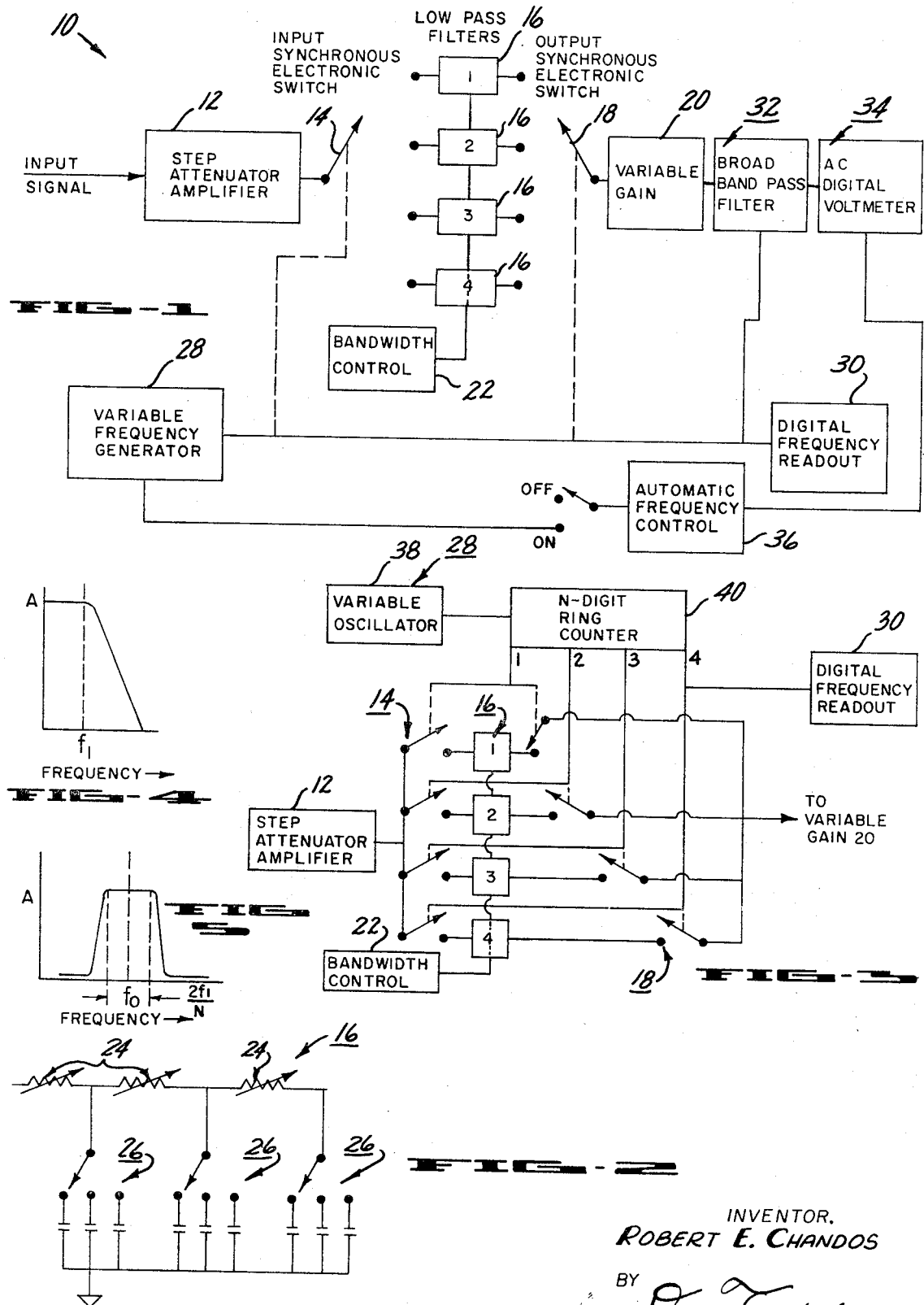

3,519,926
DIGITAL WAVE ANALYSER HAVING SEQUENTIALLY SCANNED SUBSTANTIALLY IDENTICAL, LOW PASS FILTERS
Robert E. Chandos, Santa Barbara, Calif., assignor to Electro-Optical Industries, Inc., a corporation of California
Filed Oct. 31, 1966, Ser. No. 590,821
Int. Cl. G01r 23/16, 27/02
U.S. Cl. 324—77                                   9 Claims

ABSTRACT OF THE DISCLOSURE

There is disclosed herein an improved wave analyser arrangement for determining the constituent frequency in an information signal having an unknown frequency. This is achieved by having a plurality of low pass filters which are, preferably, adjustable as to the corner frequency thereof. Each of the low pass filters is identical to each other and has the same corner frequency. An input and an output synchronous switch are provided and the unknown frequency signal is correspondingly switched sequentially through the plurality of filters at a frequency determined by a variable frequency generator. The frequency of the variable frequency generator is a particular test frequency for which it is to be determined whether or not such a frequency exits in the information signal having the unknown frequency. The synchronous input and output switches, of course, ensure that the same low pass filter into which the signal is being provided is also the one from which the output is being obtained. The variable frequency generator may then be either manually or automatically varied over the frequency range of interest and when an output magnitude is determined it is known that there was a component frequency in the unknown frequency information signal at the particular frequency then existing in the variable frequency generator.

---

This invention relates to the wave analyser art and more particularly to an improved digital wave analyser.

In many applications it is desirable to determine the frequencies comprising a particular electrical signal. Further, it is often desirable to determine not only the frequencies that may be present in the unknown electromagnetic radiation signal, but also, quantitatively, the magnitude of any particular frequency contained within the unknown electrical input signal.

In order to determine the constituent frequencies comprising the unknown electrical input signal and the quantitative magnitudes thereof, it is, of course, necessary that measurements be made of the unknown input signal at various test frequencies and that these test frequencies be accurately known in order that the frequency content of the unknown signal be accurately determined. Further, of course, it is preferable that a digital wave analyser accomplishing the above also have a wide range of operation in order that the frequency content of an unknown wave over a comparatively wide range of test frequencies may be determined and, further, the bandwidth at each frequency should be narrow in order that a high degree of accuracy may be obtained in the particular reading for each test frequency.

Accordingly, it is an object of applicant's invention herein to provide an improved wave analyser.

It is another object of applicant's invention herein to provide a digital wave analyser having a comparatively wide operational range and a comparatively narrow bandwidth at each test frequency for determining the frequency content of an unknown electromagnetic radiation input signal.

It is yet another object of applicant's invention herein to provide a digital wave analyser providing accurate measurements of the frequency content and magnitude of an unknown electrical input signal.

The above and other objects are achieved and the above-mentioned desiderata are realized in applicant's invention herein. In one embodiment of applicant's invention there is provided a step attenuator and amplifier stage adapted to receive the unknown electrical input signal. The step attenuator and amplifier combination provides amplitude control to the input signal so that the input signal will have a magnitude within a predetermined range regardless of the original magnitude of the input signal.

The signal leaves the step attenuator and amplifier stage and enters a synchronous electronic switch. The synchronous electronic switch sequentially switches the input signal through a plurality of low pass filters. Each one of the plurality of low pass filters is identical to all others and each has a characteristic of passing all frequencies below a given value. In the preferred embodiment of applicant's invention the low pass filters are variable so that the corner frequency of the low pass filter is adjustable between, for example, .01 and 100 cycles per second. Each of the filters is adjusted to the same particular corner frequency.

A frequency generator controls the switching frequency between the low pass filters by the electronic switch and the switching frequency is a function of the desired test frequency. Therefore, the frequency generator is variable and is adapted to provide a wide range of stable test frequencies in order that the unknown signal may be sampled at any desired frequency. The frequency generator also controls the sequential switching rate of another synchronous electronic switch that is connected to receive sequentially the outputs of each individual low pass filter. The input synchronous electronic switch and output synchronous electronic switch are, of course, synchronized so that the output switch reads the output from the particular low pass filter to which the unknown input electrical signal is being fed at a given instant of time.

The output from the output electronic switch is fed into a variable gain stage to provide a particular gain level for the signal and then into a broad band pass filter controlled by the frequency generator that is utilized to eliminate the side lobes that may be present in the output signal from the synchronous electronic output switch.

The output from the broad band pass filter is then fed into an AC digital voltmeter where the magnitude of the signal at the particular frequency specified by the frequency generator may be evaluated.

Since there may be drift and/or slight changes in the frequency provided by the frequency generator, a digital frequency readout is coupled to the frequency generator so that at the time of making the magnitude determination from the digital voltmeter, the exact test frequency may be determined from the digital frequency readout. Similarly, to counteract drift and slight variations, an automatic frequency control is coupled between the broad band pass filter and the frequency generator so that the frequency generator will, once the signal strength at the broad band pass filter is above a particular level, follow slight variations in frequency so that the frequency generator will follow the peak signal strength at the broad band pass filter. The automatic frequency control herein utilized by applicant is similar to conventional automatic frequency controls.

The above and other embodiments of applicant's invention are more fully described in the following detailed description taken together with the accompanying drawings wherein similar reference characters refer to similar elements throughout and in which:

FIG. 1 is a block diagram of one embodiment of applicant's invention;

FIG. 2 is a schematic diagram of a band pass filter useful in the practice of applicant's invention herein;

FIG. 3 is a block diagram of a synchronous switching system useful in the practice of applicant's invention herein; and FIGS. 4 and 5 are graphical illustrations of characteristics of the operation of applicant's invention herein.

Referring now to FIG. 1, there is shown a block diagram of one embodiment of applicant's invention of an improved digital wave analyser generally designated 10. As shown thereon, a step attenuator-amplifier stage 12 receives an unknown electrical input signal whose constituent frequencies are to be determined. The input signal that is fed into the step attenuator-amplifier stage is an electrical signal whose exact frequency content is unknown and is to be determined by utilization of applicant's improved digital wave analyser 10. The step attenuator-amplifier stage increases the usable range of signal strength that are usable in the digital wave analyser 10. That is, for comparatively weak signals, the step attenuator-amplifier 12 increases and amplifies the signal strength and for comparatively strong signals the step attenuator-amplifier stage 12 decreases the signal strength so that the unknown input electromagnetic radiation signal falls within a predetermined amplitude range.

After leaving the step attenuator-amplifier stage 12, the signal enters the input synchronous electronic switch stage 14 where it is sequentially fed to the low pass filters 16. The low pass filters 16 are identical and, in the preferred embodiment of applicant's invention, there are at least three such low pass filters 16. However, as shown on FIG. 1, applicant provides four low pass filters 16 and it will be appreciated that any desired number of low pass filters 16 may be provided in the practice of applicant's invention herein as long as there are at least three such low pass filters 16.

An output synchronous electronic switch 18 is in synchronous operation with the input synchronous electronic switch 14 so that the output synchronous electronic switch 18 is sequentially coupled to the same low pass filters 16 to which the input synchronous electronic switch 14 is instantaneously coupled. Thus, the input synchronous electronic switch 14, low pass filters 16 and output synchronous electronic switch 18 are cooperatively coupled together so that the signal is sequentially passed through the low pass filters 16 from the step attenuator stage 12 to a variable gain stage 20 at a predetermined sequential switching frequency.

In addition to the low pass filters 16 being identical, it is also desirable that the low pass filters 16 be variable in order that the corner frequency thereof be adjustable, for example, between .01 and 100 cycles per second. It will be appreciated, however, that the low pass filters 16 may, if desired, be fixed at one particular corner frequency, or may have other variable frequency ranges. A bandwidth control 22 is utilized to control the corner frequency of the low pass filters 16.

FIG. 2 illustrates one form of low pass filter 16 that is useful in the practice of applicant's invention herein. As shown on FIG. 2, there are a plurality of variable resistors 24 coupled to a plurality of capacitor stages 26 in a filter circuit. As seen on FIG. 2, both the resistors 24 and the capacitor stages 26 are variable in order that the low pass filters 16 may be adjusted to have a corner frequency at a predetermined frequency value that is variable over a predetermined frequency range.

FIG. 4 illustrates a typical characteristic curve for a filter stage such as the low pass filter 16 and the frequency $f_1$ is generally designated the corner frequency of the low pass filter 16. That is, the low pass filter 16 passes all frequencies less than $f_1$ therethrough, but, depending upon the particular filter characteristics, progressively attenuates frequencies greater than $f_1$.

By varying the corner frequency $f_1$ by means of the bandwidth control 22, which varies the variable resistors 24 and selects the particular capacitor of the capacitor stages 26 for each stage of the three stage RC filter illustrated on FIG. 2, variable corner frequencies may be obtained for the low pass filters 16. It will be appreciated, of course, that all of the low pass filters 16, that is, as shown on FIG. 1, those designated 1, 2, 3 and 4, are simultaneously controlled by the bandwidth control 22 so that the corner frequency $f_1$ from each of the low pass filters 16 is identical. In the preferred embodiment of applicant's low pass filters 16 as illustrated on FIG. 2, the capacitor stages 26 are utilized for providing changes in corner frequency $f_1$ on the order of factors of 10, while variations in the variable resistors 24 provide variations between 1 and 10.

A variable frequency generator 28 is controlled by the operator, or automatically scanned, of the digital wave analyser 10 to provide the various test frequencies that are utilized to determine the constituent frequencies of the unknown electrical input signal fed into the step attenuator amplifier stage 12. Thus, the variable frequency generator, according to applicant's invention herein, controls the sequential switching rate of the input electronic switch 14 and output electronic switch 18 to the desired test frequency. A digital frequency readout 30 is also provided in the preferred embodiment of applicant's invention to provide an exact measurement of the particular test frequency actually generated by the variable frequency generator 28. Thus, even though there may be small variations from the frequency set by the operator of the digital wave analyser 10 in the variable frequency generator 28, the digital frequency readout 30 will always indicate the exact frequency that is instantaneously being generated by the variable frequency generator 28.

After leaving the variable gain stage 20, the signal is fed into a tuneable broad band pass filter stage 32 and from there into an AC digital voltmeter 34 wherein the magnitude of the signal strength at the particular frequency provided by the variable frequency generator that is present in the unknown electrical input signal is indicated. The broad band pass filter stage 32 tends to eliminate the side lobes or spurious responses that may be present in the signal after passing through the low pass filters 16. Since the input and output synchronous electronic switches 14 and 18, respectively, provide a sequential switching rate at the test frequency generated by the variable frequency generator, the broad band pass filter has, as its center frequency, this test frequency as generated by the variable frequency generator and a bandwidth equivalent to twice the corner frequency of the low pass filters 16 divided by N, the number of low pass filters 16.

FIG. 5 illustrates this characteristic of applicant's improved digital wave analyser 10 and, as shown on FIG. 5, the frequency $f_0$ is the test frequency generated by the variable frequency generator 28 and the bandwidth at the test frequency $f_0$ is equivalent to twice the corner frequency $f_1$ of the low pass filters 16 divided by N, the number of low pass filters 16. Thus, the frequency generator 28 in providing the center or test frequency $f_0$ and the sequential switching operation of the input and output synchronous electronic switches 14 and 18, respectively, at this test frequency $f_0$ effectively translates $2f_1$ frequency bandwidth to center on the center or test frequency $f_0$ established by the variable frequency generator.

Applicant has also found it advantageous to provide a conventional automatic frequency control 36 connected between the digital voltmeter 34 and frequency generator 28 so that, for a given signal strength as shown on the AC digital voltmeter 34, for a particular frequency the variable frequency generator 28 will automatically follow small variations in this frequency in order to maintain the signal strength as shown. The digital frequency readout 30 will, of course, always indicate the exact frequency generated by the variable frequency generator. Thus, the automatic frequency control 36 is not turned on until a signal is seen recorded on the digital voltmeter 34 and the automatic frequency control then varies slightly the test frequency generated by the variable frequency generator 28 in order to follow the peak signal strength at this particular frequency in the unknown electromagnetic radiation input signal.

One arrangement for generating the variable frequency required for the test frequency in applicant's digital wave analyser 10 is illustrated in block diagram form on FIG. 3. As shown, the variable frequency generator 28 is comprised of a variable square wave oscillator 38 driving an N-digit ring counter 40. For the arrangement shown in FIG. 1, with four low pass filters 16, the N-digit ring counter is set up to establish a sequential switching between four output terminals, indicated on FIG. 3 as 1, 2, 3 and 4, and then cyclically repeat back to terminal 1 after providing the output signal at terminal 4. Each of the terminals of the N-digit ring counter is connected to one input synchronous electronic switch 14 and one output synchronous electronic switch 18 associated with one low pass filter 16. Thus, with four low pass filters 16 each output terminal of the N-digit ring counter 40 sequentially opens and closes the input and output synchronous electronic switch from one low pass filter 16. Thus, synchronous sequential switching is provided by the control of the variable frequency generator 28 and the magnitude of the constituent frequency of the unknown input signal at the frequency generated by the variable frequency generator 28, may be determined at the AC digital voltmeter 34 and the precise frequency thereof read from the digital frequency readout 30.

In operation, the unknown input signal 12 is fed into the step attenuator-amplifier 12 and the bandwidth control 22 is adjusted for any desired bandwidth within the range of adjustability of the low pass filters 16 that may be desired, if the low pass filters 16 are adjustable. The variable frequency generator 28 is then slowly swept through the particular frequency range of interest as varied by the operator of the digital wave analyser 10, or as varied automatically. When a signal is seen on the digital voltmeter 34 the variable frequency generator is stopped at the particular center frequency providing the signal at the digital voltmeter 34 and the automatic frequency control 36 is turned on. The reading on the digital frequency readout 30 simultaneously with the reading on the digital voltmeter 34 provides the precise measurement of the magnitude of the constituent frequency of the input signal at the particular test frequency generated by the variable frequency generator 28. The bandwidth control may be adjusted to narrow the bandwidth and provide an even more precise evaluation of the constituent frequency when a signal is obtained on the digital voltmeter 34.

This concludes the description of applicant's invention of an improved digital wave analyser. From the above it can been seen that simultaneous readings of the magnitude and exact frequency of a component of an unknown signal may be determined and thus the entire frequency content of an unknown electrical signal may be evaluated.

What is claimed as new and desired to be secured by Letters Patent of the United States is:

1. A digital wave analyser comprising, in combination:
a plurality of at least three substantially identical low pass filters each having substantially the same preselected corner frequency;
means for providing an unknown electrical signal input to said plurality of low pass filters having a magnitude within a predetermined range;
said means for providing an unknown signal input comprises a variable frequency generator means for generating a preselected test frequency, and a plurality of input synchronously operated electronic switches operatively connected to said variable frequency generator means for sequentially switching said unknown electrical signal input through said plurality of low pass filters at said preselcted test frequency;
output synchronously operated electronic switches operatively connected to said variable frequency generator for synchronously obtaining with respect to said input synchronously operated electronic switches an output information signal from said low pass filters; and
means for reading the signal strength of said output information signal from the output of said low pass filters.

2. The arrangement defined in claim 1 wherein the corner frequency of said plurality of low pass filters is variable within a predetermined bandwidth.

3. The arrangement defined in claim 1 wherein said variable frequency generating means further comprises an oscillator driving an N-digit ring counter;
said plurality of input and a plurality of output synchronously operated electronic switches are coupled selectively to the inputs and outputs of said pluarity of low pass filters, and said N-digit ring counter sequentially switches said plurality of input and plurality of output synchronous electronic switches to switch said unknown signal sequentially through said low pass filters at said selected test frequency; and
means for measuring the precise value of said selected test frequency.

4. The arrangement defined in claim 3 wherein said means for providing an unknown electrical signal to said plurality of low pass filters further comprises a step attenuator-amplifier stage; and
said means for obtaining said output information signal from said low pass filters comprises:
a broad band pass filter having a bandwidth of twice said corner frequency and a center frequency at said preselected test frequency; and
a digital AC voltmeter for measuring the signal strength of the constituent frequency of said unknown electromagnetic radiation signal at said predetermined test frequency.

5. The arrangement defined in claim 4 wherein said means for measuring the precise value of said preselected test frequency comprises a digital frequency readout coupled to said N-digit ring counter.

6. The arrangement defined in claim 1 and further including automatic frequency control for controlling said preselected test frequency in response to small changes in the frequency of said signal detected at the output from said low pass filters.

7. The arrangement defined in claim 2 wherein said variable frequency generating means further comprises an oscillator driving an N-digit ring counter;
a plurality of input and a plurality of output synchronously operated electronic switches are coupled selectively to the inputs and outputs of said low pass filters, and said N-digit ring counter sequentially switches said plurality of input and plurality of output synchronously operated electronic switches to switch said unknown signal sequentially through said low pass filters at said preselected test frequency; and
means for measuring the precise value of said preselected test frequency.

8. The arrangement defined in claim 7 wherein said means for providing an unknown electromagnetic radiation signal to said plurality of low pass filters further comprises a step attenuator-amplifier stage coupled to said plurality of input electronic switches; and said means for obtaining said output information signal from said low pass filters further comprises a band pass filter having a bandwidth of twice said corner frequency and a center frequency at said preselected test frequency; and said means for reading the signal strength at said preselected frequency comprises a digital AC voltmeter for measuring the signal strength of the constituent frequency of said unknown electromagnetic radiation signal at said preselected test frequency.

9. The arrangement defined in claim 8 and further including automatic frequency control means connected to said AC digital voltmeter and to said variable frequency generator means for controlling the frequency generated by said variable frequency generating means in response to small changes in the frequency of said signals detected on said digital voltmeter.

References Cited

UNITED STATES PATENTS

| 2,476,445 | 7/1949 | Lacy | 324—77 X |
| 2,629,000 | 2/1953 | Olson et al. | 324—77 X |

EDWARD E. KUBASIEWICZ, Primary Examiner